United States Patent [19]

Engel et al.

[11] 4,084,988

[45] Apr. 18, 1978

[54] METHOD AND APPARATUS FOR MAKING INSTANTANEOUS SCARFING CUTS

[75] Inventors: Stephen August Engel, Shenorock; Ronald Elmer Fuhrhop, Suffern, both of N.Y.

[73] Assignee: Union Carbide Corporation, New York, N.Y.

[21] Appl. No.: 789,720

[22] Filed: Apr. 25, 1977

Related U.S. Application Data

[63] Continuation-in-part of Ser. No. 684,833, May 10, 1976, Pat. No. 4,038,108.

[51] Int. Cl.$^2$ .......................... B23K 7/06; B23K 7/08
[52] U.S. Cl. ................................ 148/9.5; 219/121 L; 219/121 LM; 266/51
[58] Field of Search .......................... 148/9.5; 266/51; 219/121 L, 121 LM

[56] References Cited

U.S. PATENT DOCUMENTS

| | | | |
|---|---|---|---|
| 3,360,398 | 12/1967 | Garibotti | 427/43 |
| 3,597,578 | 8/1971 | Sullivan et al. | 219/121 L |
| 3,656,988 | 4/1972 | Steffen et al. | 148/9.5 |
| 3,749,878 | 7/1973 | Sullivan et al. | 219/121 L |
| 3,966,503 | 6/1976 | Engel | 148/9.5 |
| 3,966,504 | 6/1976 | Sipek et al. | 148/9.5 |

OTHER PUBLICATIONS

Adams, M. J., *The Use of the CO$_2$ Laser for Cutting and Welding,* Welding Institute Research Bulletin, vol. 9, Sep. 1968.

Sullivan, A. B. J. et al., *Gas–Jet Laser Cutting,* British Welding Journal, Aug. 1967.

*Primary Examiner*—W. Stallard
*Attorney, Agent, or Firm*—Warrick E. Lee, Jr.

[57] ABSTRACT

An instantaneous scarfing cut on the surface of a metal workpiece can be made by:
(a) causing relative motion between the workpiece and a stream of scarfing oxygen gas, and simultaneously therewith
  (1) impinging at least one laser beam on the work surface so as to produce a heated path of desired length across said surface relative to its direction of motion, said heated path being produced by the laser beam heating a series of points on said surface to their oxygen ignition temperature, and
  (2) impinging a stream of scarfing oxygen onto said heated path, thereby causing an instantaneous scarfing cut to begin along said path, and
(b) continuing the flow of scarfing oxygen until the desired length of cut has been produced.

10 Claims, 4 Drawing Figures

METHOD AND APPARATUS FOR MAKING INSTANTANEOUS SCARFING CUTS

BACKGROUND

This application is a continuation-in-part of U.S. application Ser. No. 684,833, filed May 10, 1976, now U.S. Pat. No. 4,038,108, the entire disclosure of which is incorporated herein by reference.

The present invention relates, in general, to thermochemical removal of metal from the surface of a workpiece, commonly called scarfing, and more particularly, to making instantaneous or flying scarfing cuts.

The prior art, discussed more fully in applicant's above-mentioned parent application discloses methods for making instantaneous scarfing starts which require either electric arcs and their associated complex equipment or adjuvant material, such as metal powder or hot wires. Applicant's parent application discloses methods and apparatus for making instantaneous starts by using laser beams in conjunction with a high-intensity jet of oxygen. The present invention is a modification of the invention disclosed and claimed in said parent application and distinguished therefrom in that it eliminates the use of the high intensity jet of oxygen.

OBJECTS

It is an object of this invention to provide a simple and reliable method and apparatus which is capable of making instantaneous or flying scarfing cuts on a workpiece without the use of any adjuvant powder or wire or electric arcs.

It is another object of this invention to provide a method and apparatus which is capable of making instantaneous or flying scarfing cuts without the use of a high intensity jet of oxygen to spread the starting puddle.

SUMMARY OF INVENTION

The above and other objects which will become apparent to those skilled in the art are achieved by the present invention, one aspect of which consists of a method for making an instantaneous scarfing cut on the surface of a metal workpiece, comprising the steps of:
   (a) causing relative motion between the workpiece and a stream of scarfing oxygen gas, and simultaneously therewith
      (1) impinging at least one laser beam on the work surface so as to produce a heated path of desired length across said surface relative to its direction of motion, said heated path being produced by the laser beam heating a series of points on said surface to their oxygen ignition temperature, and
      (2) impinging a stream of scarfing oxygen onto said heated path, thereby causing an instantaneous scarfing cut to begin along said path, and
   (b) continuing the flow of scarfing oxygen until the desired length of cut has been produced.

Another aspect of the invention consists of scarfing apparatus, comprising in combination:
   (a) scarfing nozzle means capable of discharging a controlled stream of scarfing oxygen onto the surface of a workpiece to be scarfed,
   (b) means for producing relative motion between said nozzle means and said workpiece, and
   (c) laser means capable of impinging at least one laser beam on the work surface so as to produce a heated path of desired length across said surface relative to its direction of motion, by having the laser beam heat a series of points on said surface to their oxygen ignition temperature, said heated path being located proximate to the centerline projection of said scarfing oxygen stream on the work surface.

The preferred method of laser heating the surface of the workpiece to its oxygen ignition temperature is by traversing a continuous wave laser beam such that the beam impinges a continuum of points across the surface of the workpiece.

The term "stream of scarfing oxygen" as used throughout the present specification and claims is intended to mean a stream of oxygen gas directed obliquely at the surface of the workpiece of sufficient intensity to thermochemically remove a surface layer of metal, customarily to a depth of about 1 to 8 mm, and to make a scarfing cut at least 25 mm wide. Streams of scarfing oxygen are preferably sheet-like, but may also be circular or of other shapes.

IN THE DRAWINGS

DETAILED DESCRIPTION OF THE INVENTION

Figure 1:
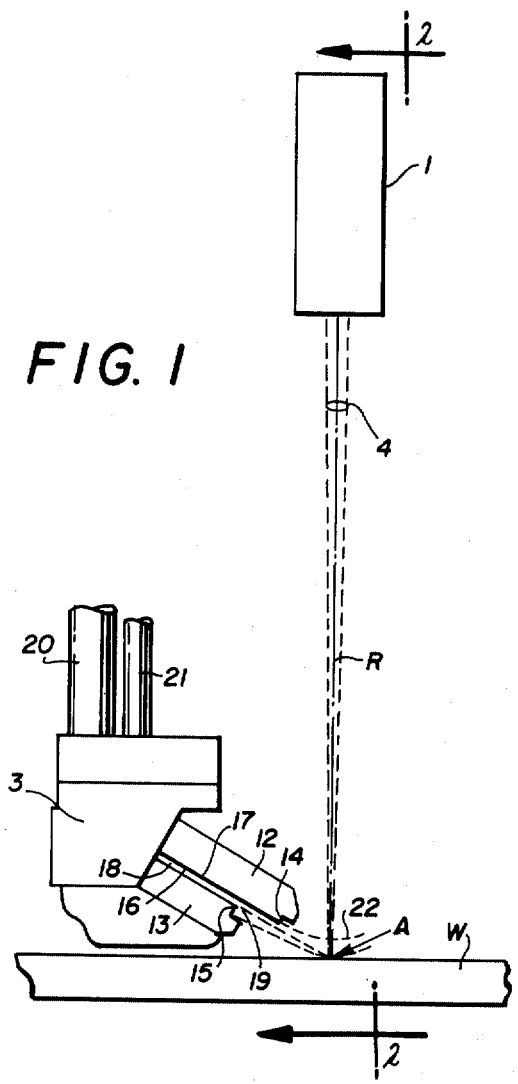
FIG. 1 is a side view illustrating a preferred embodiment of the method and apparatus of the present invention for making an instantaneous scarfing cut.

In FIG. 1, a laser unit 1, including a focusing lens 4, is mounted on the scarfing machine frame (not shown) — it could be mounted remotely — and arranged so that the laser beam R impinges on the surface of the workpiece W at point A, the point where the scarfing cut is to begin. Scarfing unit 3 is typically comprised of conventional upper and lower preheat blocks 12 and 13, respectively, which may be provided with rows of either premixed or post-mixed preheat ports 14 and 15, and suitable gas passages therein. The scarfing oxygen nozzle slot 16 is formed by the lower surface 17 of upper preheat block 12 and the upper surface 18 of the lower preheat block 13. The slot-like oxygen nozzle 16 terminates with a discharge orifice 19. In order to start the thermochemical reaction, point A may be slightly ahead of or coincide with the area enclosed by the straight line projections of surfaces 17 and 18 onto the work surface. Oxygen and fuel gas are supplied to the scarfing unit 3 through feed pipes 20 and 21, respectively by means well known in the art.

The apparatus shown in FIG. 1 functions as follows. First, the preheat flames emanating from scarfing unit 3 are ignited by actuating the flow of fuel gas from the rows of preheat ports 14 and 15, and a low flow of oxygen gas through orifice 19. The preheat flames are indicated by lines 22. Relative motion is taking place between the scarfing apparatus and the workpiece. Just before the defective area to be scarfed on the surface of workpiece W reaches point A, the stream of oxygen from orifice 19 is turned up to the scarfing oxygen rate. Simultaneously therewith, or shortly thereafter, the laser beam R is turned on, causing point A to immediately reach oxygen ignition temperature, causing an instantaneous scarfing cut to begin at point A. The laser beam is then directed across the surface of the workpiece relative to its direction of travel, causing the scarfing reaction to spread to the desired width by following the laser heated path. The stream of scarfing oxygen is kept on for as long as the scarfing cut is desired. The laser beam may be shut off as soon as the scarfing cut has reached its desired width.

Relative motion may be started after a scarfing reaction of desired width has been initiated, in those cases where a flying start is not desired. A flying start is one which takes place with the workpiece moving relative to the scarfing apparatus at normal scarfing speeds.

Figure 2:
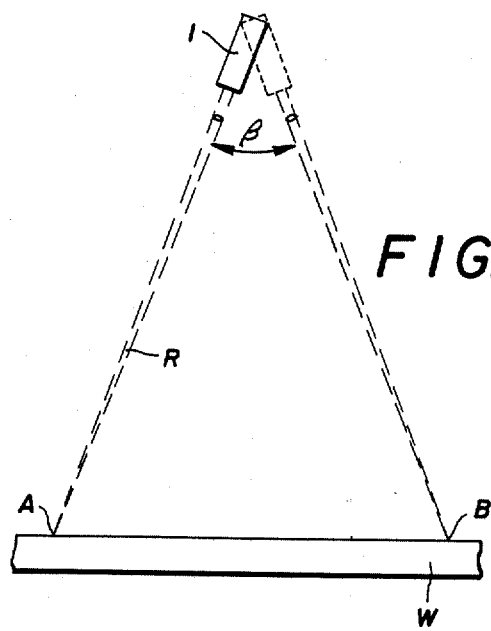
FIG. 2 is a front view (without the scarfing unit) of FIG. 1 illustrating a preferred arrangement for using a laser to successively heat a series of points on the surface of a workpiece to their oxygen ignition temperature.
Figure 3:
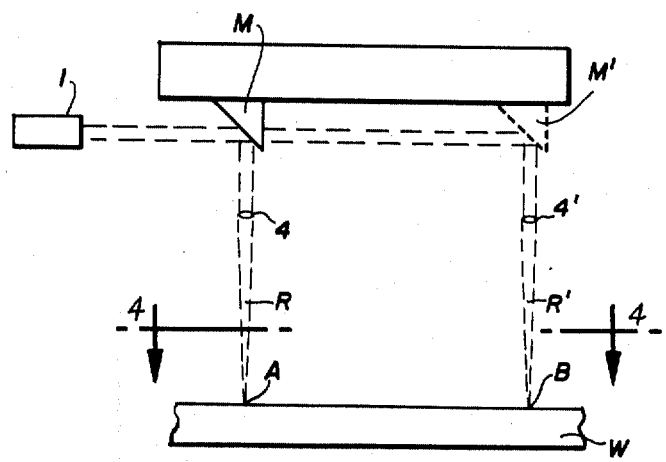
FIG. 3 shows an alternative arrangement for laser heating the surface of the workpiece.

FIGS. 2 and 3 illustrate two ways in which a laser may be used to heat a path of desired length on the work surface to its oxygen ignition temperature. FIG. 2 is a front view of FIG. 1 with the scarfing unit now shown. The laser 1 and its optical system is turned on and rotated through the angle $\beta$, causing the laser beam R to heat a continuous series of points, forming a path on the metal work surface between points A and B to be heated to their oxygen ignition temperature. Instead of rotating the laser, the beam R may be optically directed to traverse the path between points A and B.

An alternative technique for heating a path on the work surface is illustrated in FIG. 3, where the laser beam is directed between points A and B by moving (by means not shown) reflecting mirror M and lens 4, respectively across the path of the desired scarfing cut to position M' and 4'.

The laser used in FIGS. 2 and 3 is preferably of the continuous wave type. However, a pulsed laser may be used, in which case a series of closely-spaced spots between points A and B are brought to their oxygen ignition temperature. The individual spots will flow together as the oxygen is turned on. Of course, other optical arrangements may be used to achieve the same result, including use of more than one laser.

Figure 4:
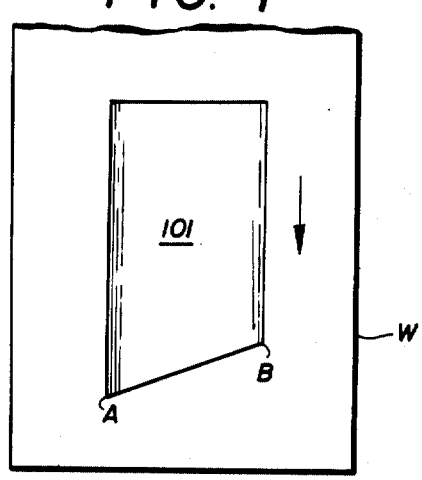
FIG. 4 illustrates the shape of a scarfing cut made when the arrangement shown in FIG. 3 is used to make a flying start.

FIG. 4 shows the shape of a scarfing cut made when a flying start is made in accordance with this invention, using a single laser and the arrangement shown in FIGS. 2 or 3. The start of the cut begins at point A and continues to point B due to relative motion between the scarfing apparatus and the workpiece W. Area 101 represents the scarfing cut.

The present invention may be used for the same purposes as disclosed in applicant's parent case, U.S. Pat. No. 4,038,108. Such uses include, but are not limited to making conventional scarfing cuts with a sheet-like stream of oxygen, i.e. desurfacing the entire surface; making individual fin-free spot scarfing cuts whose width is narrower, as wide as or wider than the width of the scarfing nozzle, and making wide spot scarfing cuts by mounting several scarfing units together for spot scarfing in a gang-pass arrangement.

What is claimed is:

1. A method for making an instantaneous scarfing cut on the surface of a metal workpiece, comprising the steps of:
    (a) causing relative motion between the workpiece and a stream of scarfing oxygen gas, and simultaneously therewith
        (1) impinging at least one laser beam on the work surface so as to produce a heated path of desired length across said surface, relative to its direction of motion, said heated path being produced by the laser beam heating a series of points on said surface to their oxygen ignition temperature, and
        (2) impinging a stream of scarfing oxygen onto said heated path, thereby causing an instantaneous scarfing cut to begin along said path, and
    (b) continuing the flow of scarfing oxygen until the desired length of cut has been produced.

2. The method of claim 1 wherein the heated path is produced by rotating a continuous wave laser beam across the work surface.

3. The method of claim 1 wherein the heated path is produced by rotating a pulsed laser beam across the work surface.

4. The method of claim 1 wherein the stream of scarfing oxygen is sheet-like.

5. The method of claim 1 wherein the heated path is produced by moving a reflecting mirror and beam focusing lens across the work surface.

6. Scarfing apparatus comprising in combination:
    (a) scarfing nozzle means capable of discharging a controlled stream of scarfing oxygen onto the surface of a workpiece to be scarfed,
    (b) means for producing relative motion between said nozzle means and said workpiece, and
    (c) laser means capable of impinging at least one laser beam on the work surface to produce a heated path of desired length across said surface relative to its direction of motion, by heating a series of points on said surface to their oxygen ignition temperature, said heated path being located proximate to the centerline projection of said scarfing oxygen stream on the work surface.

7. The apparatus of claim 6 wherein the laser means is a continuous wave laser.

8. The apparatus of claim 6 wherein said laser means is a pulsed laser.

9. The apparatus of claim 6 including means for rotating said laser beam along said path.

10. The apparatus of claim 6 including means for optically moving said laser beam along said path.

* * * * *

UNITED STATES PATENT OFFICE
CERTIFICATE OF CORRECTION

Patent No. 4,084,988         Dated April 18, 1978

Inventor(s) S. A. Engel et al

It is certified that error appears in the above-identified patent and that said Letters Patent are hereby corrected as shown below:

In col. 3, line 19, "now" should read -- not --.

Signed and Sealed this

Third Day of October 1978

[SEAL]

Attest:

RUTH C. MASON
Attesting Officer

DONALD W. BANNER
Commissioner of Patents and Trademarks